M. CLARK.
VEHICLE WHEEL TIRE.
APPLICATION FILED DEC. 14, 1912.

1,090,450.

Patented Mar. 17, 1914.

Witnesses:
O. F. Plumtree
Lucy I. Stone

Inventor
Melville Clark
by Burton & Burton
his Attys.

UNITED STATES PATENT OFFICE.

MELVILLE CLARK, OF CHICAGO, ILLINOIS.

VEHICLE WHEEL-TIRE.

1,090,450.
Specification of Letters Patent. Patented Mar. 17, 1914.
Application filed December 14, 1912. Serial No. 736,675.

*To all whom it may concern:*

Be it known that I, MELVILLE CLARK, a citizen of the United States, residing at Chicago, in the county of Cook and State of Illinois, have invented new and useful Improvements in Vehicle Wheel-Tires, of which the following is a specification, reference being had to the accompanying drawings, forming a part thereof.

The purpose of this invention is to provide an improved construction of a vehicle wheel adapted to have a pneumatic air cushion tire particularly in respect to the guards between which such cushion or pneumatic tire is retained upon the felly.

It consists in the elements and features of construction shown and described as indicated in the claims.

Figure 1:
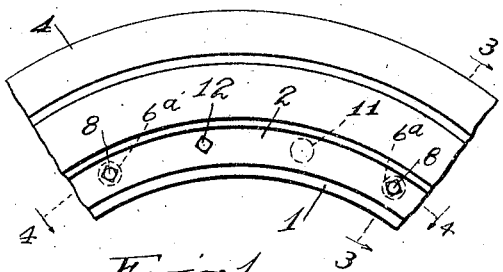
Figure 2:
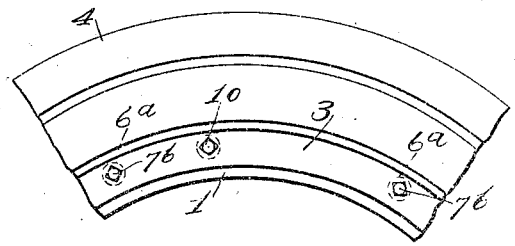
Figure 3:
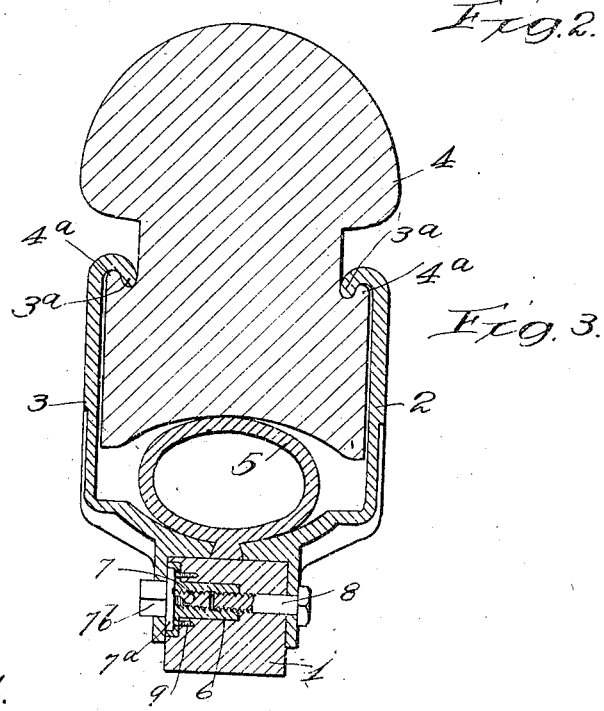
Figure 4:
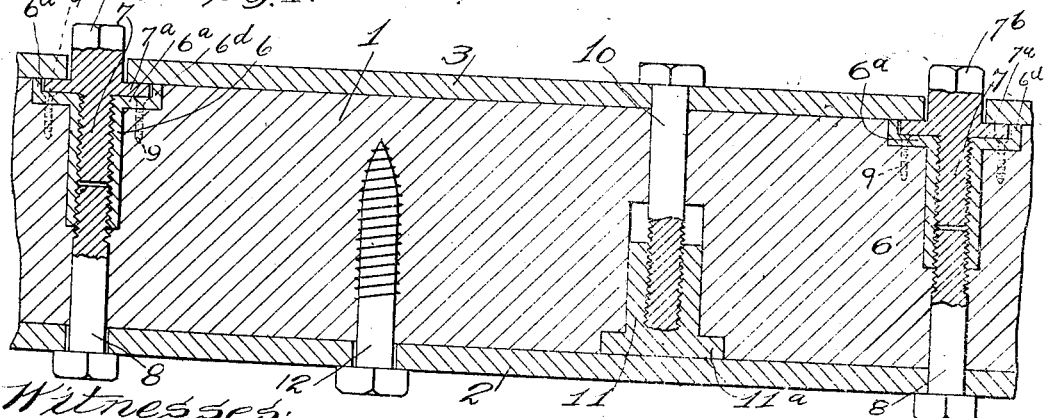

In the drawings:—Figure 1 is an outer side elevation of a segment of a wheel embodying this invention. Fig. 2 is a rear side elevation of the same segment. Fig. 3 is a section at the line, 3,—3, on Fig. 1, upon an enlarged scale. Fig. 4 is a section at the line, 4,—4, on Fig. 1.

This invention is shown as applied to a wheel having a tread member retained on the wheel between lateral metal guards which are clamped upon the felly. The pneumatic and cushion elements of the tread member are shown only in general cross sectional outline, detail features involved in the invention being suppressed or omitted.

1 represents the felly of a wheel upon which there are clamped the lateral guards, 2 and 3, between which the cushion tread member, 4, and the pneumatic tube, 5, of the tire are retained. The guards, 2 and 3, are shown as having circumferential inturned flanges, 3ª, of hook-form in cross section for engaging circumferential ribs or beads, 4ª, of the tread member, 4, of the tire.

The specific purpose of the invention is to facilitate the removal and application of the outer guard member, 3, for inserting and removing the cushion and pneumatic tread members, 4 and 5, or for obtaining access to those members for any attention which they may require; and specifically, to facilitate such removal of the outer guard member without removing or even releasing or loosening the inner guard member. To this end there are provided at frequent intervals in the circumference of the wheel interiorly threaded metal sockets, 6, each having at one end a flange, 6ª, these sockets being set into the outer lateral side of the felly which is bored to receive them and counter-bored to receive the flanges, 6ª, the counter-bore being deep enough to provide a cavity outside the flange when the socket is fully inserted to accommodate the flange, 7ª, of a bolt, 7, which is threaded for screwing into the socket and which has a head, 7ᵇ, immediately back of which the flange, 7ª, is formed, said head being adapted for engagement to rotate the bolt, being for this purpose, as shown in the drawings, square in cross-section, the length of the head from the flange being sufficient to cause it to protrude through the thickness of the outer guard member sufficiently for engagement of a key or wrench by which it may be rotated. The socket, 6, is clamped firmly into the felly by means of a headed bolt, 8, set through the felly from the opposite side and screwed into the inner end of the socket. Preferably this headed bolt, 8, is set through the inner guard member so that its head stops upon the outside of the latter and serves to bind said inner guard member onto the felly while clamping the socket, 6, securely thereto. As a precaution against rotatability of the socket, 6, this flange, 6ª, may be provided with one or more countersunk apertures through which screws or nails, 9, with countersunk heads are set into the felly with the heads flush with the outer face of the flange. If preferred, the flange, 6ª, may be furnished with a circumferential cylindrical flange, 6ᵈ, making it as a whole cup-shaped with a cavity sufficient to accommodate the thickness of the flange, 7ª, of the bolt, 7. The outer guard member, 3, is clamped onto the felly by means of headed bolts, 10, set through it from the outer side and through the felly which is bored to receive them, and screwed into sockets, 11, which are set into the felly from the inner side and provided with heads, 11ª, to accommodate which the apertures in the felly which receive the sockets are counter-bored at the inner side. By screwing up the bolts, 10, into the sockets, it will be seen that the felly and outer guard member 3, are clamped between the bolt heads and the socket nut heads, thus holding said guard securely on the felly.

To apply the outer guard 3, to the felly the flange bolts, 7, will be first screwed into the sockets, 6, then the guard will be applied to the felly, the heads, 7ᵇ, of the bolts being entered through the apertures provided in the guard, and the bolts, 10, being inserted and screwed up until the inwardly hooked flanges, 3ª, of the guard are pressed quite forcibly against the lateral flanges, 4ª, of the cushion tread member, and then before fully tightening up the bolts, 10, by rapping smartly upon the tread member at different points in the circumference, the flanges, 4ª, will be caused to spring into engagement with the flanges, 3ª, of the guard throughout the entire circumference, of the wheel, and the bolts 10, may then be tightened up fully. For removing the outer guard member, the bolts, 10, will first be withdrawn and then, by rotating the bolts, 7, by means of a suitable wrench or key to unscrew the bolts from the sockets, 6, the flanges, 7ª, will be caused to crowd the guard outwardly until the lateral flange, 4ª, of the cushion tread member springs out of engagement with the inwardly hooked flange, 3ª, leaving the guard entirely free. If deemed desirable for greater security of attachment of the inner guard member, 2, lag bolts, 12, may be employed in addition to the bolts, 8, for securing it to the felly.

I claim:—

1. In a vehicle wheel, in combination with the felly, metal guards bound onto the opposite sides of the felly for retaining a tread member between them; means for clamping the guards onto the felly, and means for forcing one of the guards off the felly, consisting of interiorly threaded sockets mounted in the felly; bolts threaded for screwing into the sockets having each a head adapted for engagement for rotating it and a transverse flange back of the head, the guard having apertures through which the heads protrude for exterior engagement to rotate them.

2. In a vehicle wheel, in combination with the felly, lateral guards bound onto opposite sides of the felly for retaining a tread member; means for clamping the lateral guards onto the felly and means for forcing one of the guards off the felly, said last mentioned means consisting of a multiplicity of devices distributed over the entire circumference of the felly, each comprising an interiorly threaded socket having a flange head and set into the felly from the outer side, the felly being bored to receive it and counter-bored to receive the flange, a headed bolt set into the felly from the opposite side and screwed into the inner end of the socket for clamping the felly between the flange of the socket and the head of said bolt, and another bolt having a head adapted for engagement to rotate it and transversely flanged back of the head, said last mentioned bolt being screwed into the outer end of the socket, its flange being accommodated in a counter-bore which receives the socket flange, the outer guard having apertures through which the heads of such bolts protrude for engagement to rotate them.

3. In a vehicle wheel, in combination with the felly, metal guards bound onto opposite sides of the felly for retaining a tread member between the guards, a plurality of devices distributed throughout the circumference of the wheel, each comprising an interiorly threaded socket flanged at one end, two bolts screwed into said socket from opposite ends thereof, the felly being bored from side to side and counter-bored from one side to receive the socket, and further counter-bored to accommodate its flange, one of the bolts having a head adapted to be engaged for rotating it, and a transverse flange back of the head adapted to be accommodated in the counter-bore which receives the socket flange, the outer guard being apertured to permit said bolt head to protrude for engagement of a rotating means, the inner guard being apertured to receive the other bolt, and said other bolt having a head for engaging outside said inner guard, and means for clamping the outer guard onto the felly.

4. In a vehicle wheel, in combination with the felly, metal guards bound onto the opposite sides of the felly for retaining a tread member between them; means for clamping the guards onto the felly, and means for forcing one of the guards off the felly, consisting of interiorly threaded sockets mounted in the felly; bolts threaded for screwing into the sockets each having a head adapted for engagement for rotating it and a transverse flange back of the head through which the head protrudes for exterior engagement to rotate it, the means for clamping the outer guard to the felly consisting of interiorly threaded sockets headed at one end, set into the inner side of the felly and headed bolts set through the outer guard and into the felly and screwed into said sockets.

MELVILLE CLARK.

Witnesses:
CHAS. S. BURTON,
LUCY I. STONE.